(12) United States Patent
Panyavoravaj et al.

(10) Patent No.: US 7,916,599 B1
(45) Date of Patent: Mar. 29, 2011

(54) METHOD TO BALANCE SPINDLES IN A PLURALITY OF DISK DRIVES

(75) Inventors: Boworn Panyavoravaj, Bangkok (TH); Maneerat Suthampitak, Nakhonpathom (TH)

(73) Assignee: Western Digital Technologies, Inc., Irvine, CA (US)

( * ) Notice: Subject to any disclaimer, the term of this patent is extended or adjusted under 35 U.S.C. 154(b) by 512 days.

(21) Appl. No.: 12/126,849

(22) Filed: May 23, 2008

(51) Int. Cl.
*G11B 7/00* (2006.01)

(52) U.S. Cl. ............ 369/53.3; 73/462; 73/468; 73/1.84

(58) Field of Classification Search .................. None
See application file for complete search history.

(56) References Cited

U.S. PATENT DOCUMENTS

| | | | |
|---|---|---|---|
| 6,109,101 A * | 8/2000 | Iwabuchi et al. ............... 73/462 |
| 6,479,912 B2 | 11/2002 | Kikuchi et al. | |
| 6,484,575 B2 | 11/2002 | Horning et al. | |
| 6,550,328 B1 | 4/2003 | Horning et al. | |
| 6,594,109 B2 | 7/2003 | Renken | |
| 6,741,418 B2 | 5/2004 | Renken | |
| 6,778,353 B1 | 8/2004 | Harper | |
| 6,885,118 B2 | 4/2005 | Fu et al. | |
| 6,947,253 B2 | 9/2005 | Pfeiffer et al. | |
| 7,099,112 B1 | 8/2006 | Harper | |
| 7,230,728 B2 | 6/2007 | Su et al. | |
| 2002/0024762 A1 | 2/2002 | Renken | |
| 2002/0092351 A1 | 7/2002 | Horning et al. | |
| 2005/0046283 A1 | 3/2005 | Fu et al. | |
| 2005/0047002 A1 | 3/2005 | Fu et al. | |
| 2005/0047003 A1 | 3/2005 | Nakamiya et al. | |
| 2006/0087764 A1 | 4/2006 | Fu et al. | |
| 2006/0203378 A1 | 9/2006 | Fu et al. | |

* cited by examiner

*Primary Examiner* — Wayne R Young
*Assistant Examiner* — Brian Butcher

(57) ABSTRACT

A method to balance spindles in a plurality of disk drives is disclosed and claimed. An initial imbalance and initial phase for one of the plurality of disk drives is determined, the determination depending upon an amplitude and phase calibration. One of a plurality of balancing masses is selected based on the initial imbalance and attached at an angular position selected based upon the initial phase. A final imbalance after attachment is similarly determined. These determinations are repeated for each of the plurality of disk drives, with the final imbalance and the initial imbalance recorded for each. The amplitude calibration is adjusted based on a comparison of a measured distribution and a theoretical distribution of the final imbalance versus the initial imbalance.

20 Claims, 8 Drawing Sheets

METHOD TO BALANCE SPINDLES IN A PLURALITY OF DISK DRIVES

FIELD OF THE INVENTION

The present invention relates generally to spindles for information storage devices, and in particular to methods for balancing disk drive spindles.

BACKGROUND

Referring to FIG. 1, a typical hard disk drive 100 includes a disk drive base 102, at least one disk 104, 106 (such as a magnetic disk, magneto-optical disk, or optical disk), a spindle 108 for rotating the disk about a spindle axis of rotation 122, and a head stack assembly (HSA) 124. A printed circuit board assembly (not shown) is attached beneath the disk drive base 102 and includes electronics and firmware for controlling the rotation of the spindle 108, for controlling the position of the HSA 124, and for providing a data transfer channel between the disk drive 100 and its host.

The head stack assembly 124 typically includes an actuator 128, and a plurality of head gimbal assemblies (HGAs) 132. Each HGA 132 includes a head 134 for reading and writing data from and to a corresponding surface of disks 104, 106. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface.

During operation of the disk drive 100, the actuator 128 must rotate to position the heads 134 adjacent desired information tracks on corresponding surfaces of disks 104, 106. The actuator 128 includes a pivot bearing cartridge 136 to facilitate such rotational positioning. One or more actuator arms 130 extend from the actuator 128. An actuator coil 142 is supported by the actuator 128 opposite the actuator arms 130. The actuator coil 142 is configured to interact with a fixed magnet assembly 144 to form a voice coil motor. The printed circuit board assembly provides and controls an electrical current that passes through the actuator coil 142 and results in a torque being applied to the actuator 128. A latch/crash stop assembly 156 may limit excessive rotation of the actuator 128 in a given direction and/or when the disk dive 100 is not in use.

The spindle 108 typically includes a rotor including one or more rotor magnets, a rotating hub on which disks are mounted and clamped, a clamp 120 that is attached to the rotating hub (clamping one or more disks to rotate with the hub), and a stator. If more than one disk (e.g. disks 104, 106) is mounted on the hub, then the disks are typically separated by one or more spacer rings that are mounted on the hub between the disks. Various coils of the stator are selectively energized to form an electromagnetic field that pulls/pushes on the rotor magnet(s), thereby rotating the hub. Rotation of the spindle hub results in rotation of the clamp, spacer rings, and mounted disks.

Excessive imbalance of the disk mounting hub, disk clamp 120, disks 104, 106, and spacer rings (if any) of the spindle can cause undesirable disk drive vibrations and associated customer complaints. In extreme cases, such vibrations might even degrade the ability of the actuator to position the heads adjacent desired information tracks on the disk for reading and writing data. Therefore, it is advantageous to balance the hub, clamp, disk(s), and spacer rings (if any) of the spindle while or after they are assembled together.

In the example of FIG. 1, conventional balancing ring 112 is positioned at the top of disk clamp 120 of the spindle 108. The disk clamp 120 clamps the two disks 104 and 106 and associated spacer ring(s) to the hub of spindle 108 so that those disks and spacer rings rotate with the hub. The disk clamp 120 and conventional balancing ring 112 of the spindle 108 also rotate with the hub. The conventional balancing ring 112 includes a gap 114 along its circumference so that it is an open ring rather than a closed ring. The gap 114 constitutes a region of reduced mass that can be angularly positioned for balancing. Mechanical interference between a free position of the conventional balancing ring 112 and a corresponding groove in the disk clamp 120 creates a radial force that, through friction, resists incidental re-positioning of the conventional balancing ring 120 (while allowing deliberate re-positioning during balancing). Other conventional disk drive spindles have used selected discrete balancing masses inserted into one or more of a pattern of holes in the spindle hub, the holes being arranged at different angular positions, to accomplish balancing.

In the environment of modern disk drive manufacturing, thousands of disk drive spindles need to be balanced each day, and so tools (typically automated to some degree) have been developed to facilitate this. Such tools may be capable of adding, removing, or moving one or more masses on the hub, relative to the spindle axis of rotation 122, to counteract a net radial imbalance of the rotor (i.e. a net imbalance that would tend to dynamically translate the axis of rotation).

For example, such a balancing tool may measure an initial imbalance, and then select and affix a balancing ring of appropriate size and mass to the top of the disk clamp (e.g. balancing ring 112). Alternatively, for example, such a balancing tool may measure an initial imbalance, and then select and affix a discrete balancing mass through an opening in the disk clamp and then into one of a pattern of holes in the spindle hub, the holes being at different angular positions relative to the spindle hub.

In either case, the selection and positioning of an appropriate balancing mass or masses would depend upon the calibration of the associated imbalance measurement(s). Today, such calibration is typically accomplished by a manual process that may be burdensome and/or may not provide acceptable consistency. Thus, there is a need in the art for an improved process for practical calibration of the tools used to balance disk drive spindles in a high-volume manufacturing environment.

SUMMARY

A method to balance spindles in a plurality of disk drives is disclosed and claimed. The spindle of one of the plurality of disk drives is rotated. While the spindle of that one of the plurality of disk drives is rotating, an initial amplitude and an initial phase of an electrical signal that corresponds to an initial imbalance for that one of the plurality of disk drives is measured. The initial imbalance is determined based on the initial amplitude and an amplitude calibration. One of a plurality of balancing masses is selected, the selection being based on the initial imbalance. The balancing mass is attached to the spindle of that one of the plurality of disk drives, at an angular position selected based upon the initial phase and a phase calibration. The spindle of that one of the plurality of disk drives is again rotated. While the spindle of that one of the plurality of disk drives is again rotating, a final amplitude and a final phase of an electrical signal that corresponds to a final imbalance for that one of the plurality of disk drives is measured. The final imbalance is determined based on the final amplitude and an amplitude calibration. These determinations are repeated for each of the plurality of disk drives, and the final imbalance and the initial imbalance for each of the plurality of disk drives is recorded. The amplitude calibration is adjusted based on a comparison of a measured distribution and a theoretical distribution of the final imbalance versus the initial imbalance.

DESCRIPTION OF THE PREFERRED EMBODIMENTS

Figure 2:
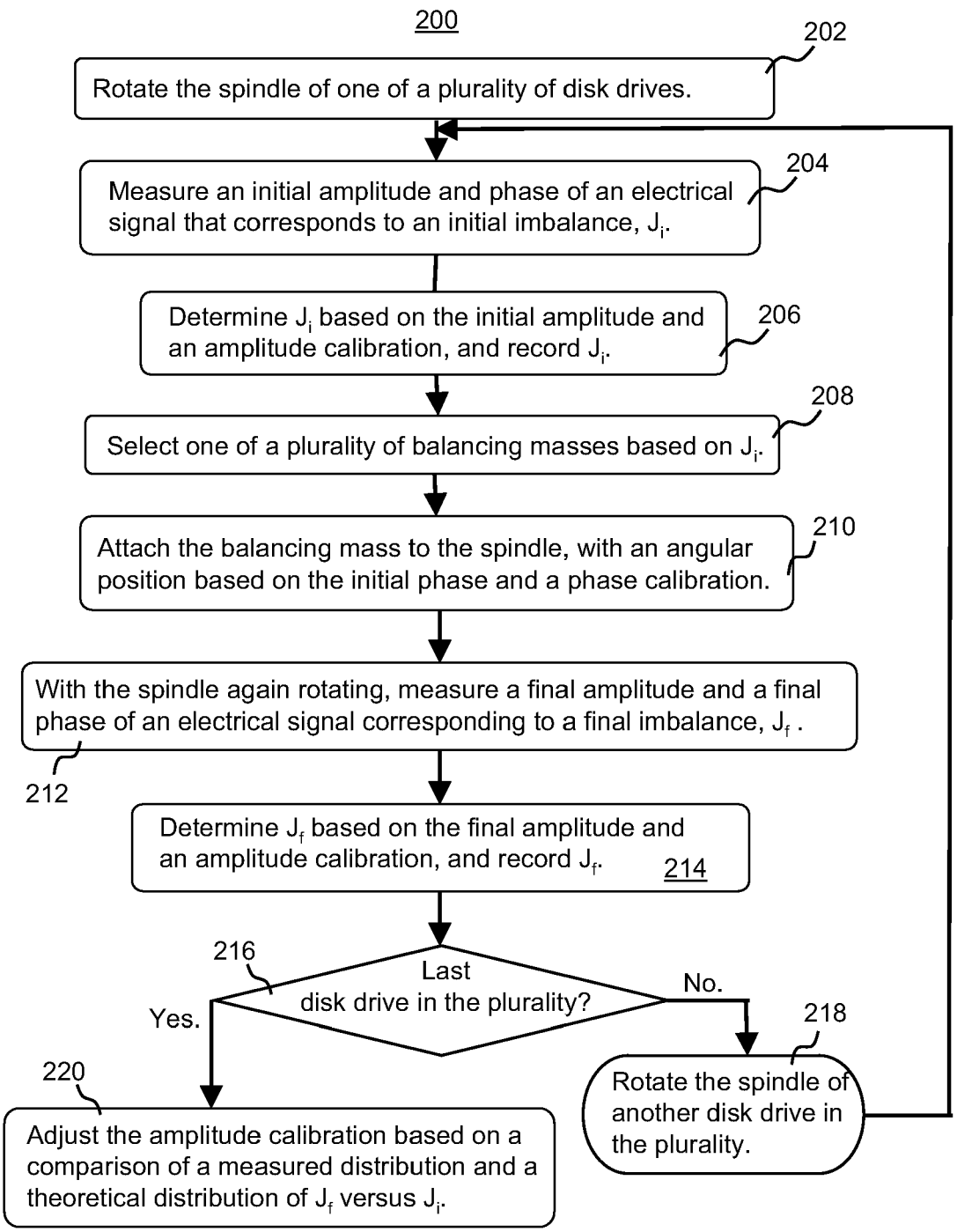
FIG. 2 depicts a flow chart of the steps of a method according to an exemplary embodiment of the present invention.

FIG. 2 depicts a flow chart 200 of the steps of a method to balance spindles in a plurality of disk drives, according to an exemplary embodiment of the present invention. "Spindle" may refer to the rotating hub, and everything affixed to rotate with the hub such as the disk clamp and what it clamps (disks and spacer rings). In step 202, the spindle of one of the plurality of disk drives is rotated, for example at a constant angular velocity. In step 204, while the spindle of that one of the plurality of disk drives is rotating, an initial imbalance $J_i$ for that one of the plurality of disk drives is measured. Since the spindle is rotating, the measurement of initial imbalance $J_i$ will give a periodic result (e.g. electrical signal output from a force or motion transducer) having the same frequency as that of spindle rotation, and the angular position of the initial imbalance $J_i$ with respect to the spindle may be characterized by the phase of that periodic signal. The amplitude of the periodic signal depends on an amplitude calibration, and on the mass & effective radius of the imbalance, and the angular velocity of the spindle. Specifically the imbalance force will be the product of the imbalance (mass times radius) and the square of the angular velocity of the spindle. Accordingly, in step 204, while the spindle is rotating, an initial amplitude and an initial phase of an electrical signal that corresponds to an initial imbalance $J_i$ is measured. In step 206, the initial imbalance $J_i$ is determined based on the initial amplitude and knowledge of the amplitude calibration. The spindle rotation may optionally be temporarily stopped after the determination of the initial imbalance $J_i$.

Figure 1:
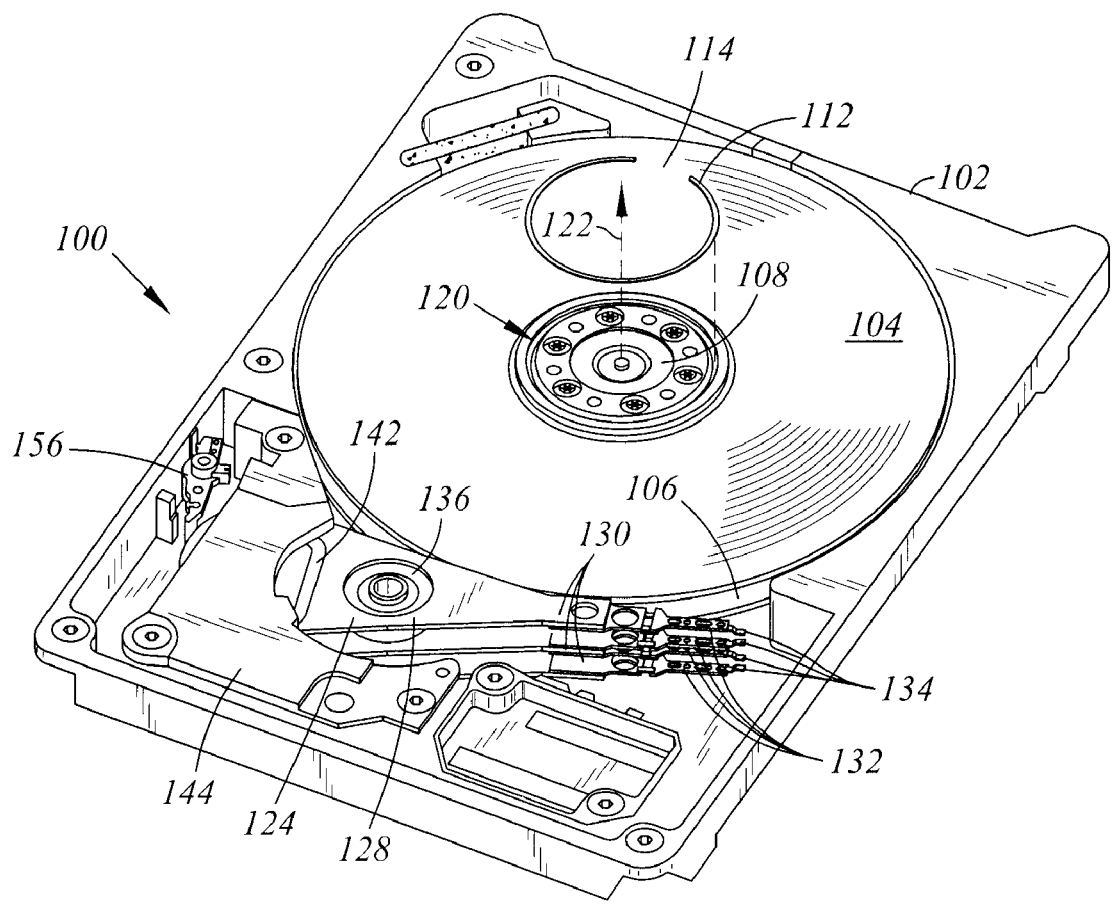
FIG. 1 is a partially-exploded perspective view of a disk drive having a conventional balancing ring at the top of the disk clamp.

In step 208, one of a plurality of balancing masses is selected, the selection being based on the initial imbalance $J_i$. Preferably, the balancing mass that is selected is the one having an imbalance that is closest in amplitude to that of the initial imbalance $J_i$. In step 210, the selected balancing mass is attached to the spindle of that one of the plurality of disk drives at an angular position selected based upon the initial phase and a phase calibration. Preferably the selected balancing mass is attached at an angular position so that the phase of its imbalance as it rotates with the spindle is directly opposite the phase of the initial imbalance $J_i$ as it rotates with the spindle. For example, the selected balancing mass may be attached to a clamp that is attached to a hub of the spindle of said one of the plurality of disk drives, with an angular position so as to directly oppose the initial imbalance $J_i$. For example, each of the plurality of balancing masses may comprise a C-shaped wire ring having a ring center and a circumferential gap that defines a circumferential gap length, like conventional balancing ring 112 shown in FIG. 1. In such an embodiment, if the phase calibration is accurate, the C-shaped wire ring will be attached to the spindle so that its circumferential gap is at the same angular position as the initial imbalance $J_i$. That way, the more massive portion of the C-shaped wire ring will be in a position directly opposing the initial imbalance $J_i$. In such an embodiment, the wire cross-sectional diameter of each of the plurality of balancing masses is preferably but not necessarily the same. Also in such an embodiment, the ring radius measured between the ring center and the circumferential gap of each of the plurality of balancing rings is preferably but not necessarily the same so that the circumferential gap length determines a known imbalance of each of the plurality of balancing rings. This known imbalance will be angularly oriented opposite the circumferential gap, so that the phase of the known imbalance with the rotating spindle will be opposite of the phase of the circumferential gap with the rotating spindle.

In step 212, with the spindle of that one of the plurality of disk drives again rotating, a final amplitude and a final phase of an electrical signal that corresponds to a final imbalance, $J_f$, is measured. In this context, saying "again rotating" does not require a previous stoppage (or a period of reduced angular velocity) after the previous period of rotation—continuous and steady rotation can qualify as including an initial period of rotation and then including a subsequent period of "again" rotating. Also, the word "rotating" does not imply a single revolution but can include any number of revolutions, with the number being integer or non-integer, and/or being more or less than one.

In step 214, the final imbalance is determined based on the final amplitude and an amplitude calibration. As indicated by flow chart symbols 216 and 218 and the associated arrows, steps 204 through 214 are repeated for each of the plurality of disk drives, recording the final imbalance $J_f$, and the initial imbalance $J_i$, for each of the plurality of disk drives. Then, in step 220 the amplitude calibration is adjusted if necessary based on a comparison of a measured distribution and a theoretical distribution of the final imbalance $J_f$ versus the initial imbalance $J_i$.

Preferably but not necessarily, the known imbalance of each of the balancing masses differs from that of another of the balancing masses by the same imbalance difference that distinguishes other pairs of the plurality of balancing masses (hereinafter called the "first imbalance difference"). For example, the plurality of balancing masses may have imbalances according to Table 1 below, according to which the first imbalance difference is 0.160 gm-mm.

TABLE 1

| Balancing Mass No. | Imbalance (gm-mm) |
|---|---|
| 1 | 0.160 |
| 2 | 0.320 |
| 3 | 0.480 |
| 4 | 0.640 |
| 5 | 0.800 |
| 6 | 0.960 |
| 7 | 1.120 |

Figure 3:
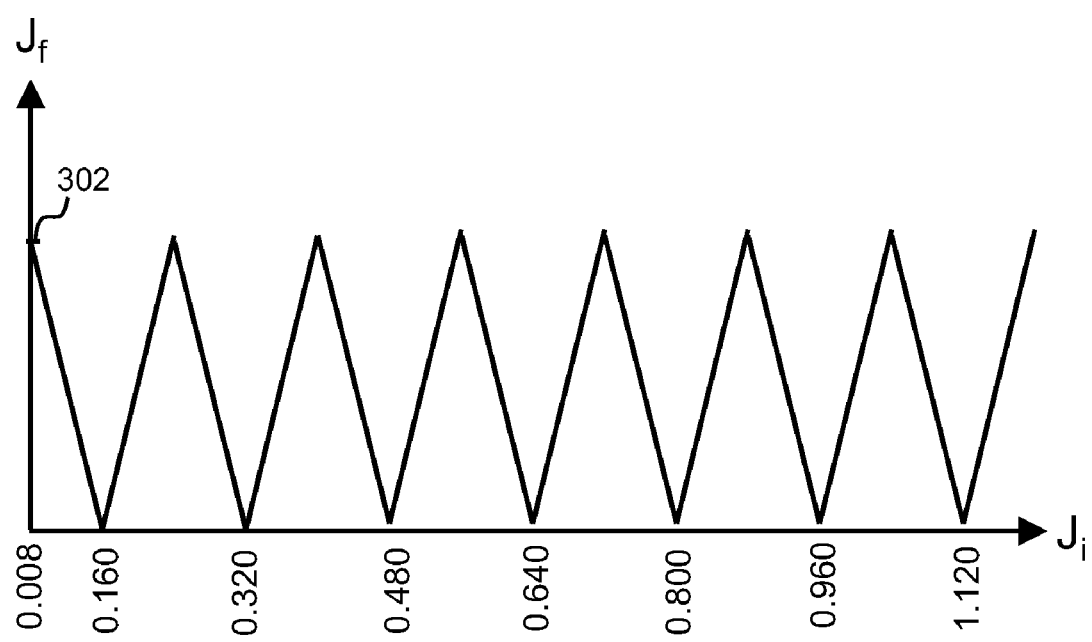
FIG. 3 depicts a theoretical distribution of final imbalance versus initial imbalance for a population of disk drives, according to an embodiment of the present invention with ideal amplitude and ideal phase calibration.

FIG. 3 depicts a theoretical distribution of the final imbalance $J_f$ versus the initial imbalance $J_i$, that is a distribution expected for a fictitious population of disk drives having randomly distributed imbalances, according to an example embodiment of the present invention. In the embodiment of FIG. 3, the theoretical distribution of the final imbalance $J_f$ versus the initial imbalance $J_i$ is a periodic sawtooth distribution having a theoretical period that is equal to the first imbalance difference, and having a theoretical amplitude that is equal to half the first imbalance difference. This is because, even assuming attachment with perfect angular position in step 210, the selection of the balancing mass in step 208 can exactly cancel the initial spindle imbalance $J_i$ only for disk drives where the initial spindle imbalance $J_i$ is equal to the imbalance of the selected balancing mass. Such situations of exact canceling are represented by the minimums in the sawtooth distribution of FIG. 3. On the other hand, the maximums in the sawtooth distribution of FIG. 3 correspond to disk drives where the initial spindle imbalance J, is at a value that is halfway between the imbalance of two equally-beneficial balancing masses, so that no matter which balancing mass is selected the same final imbalance $J_f$ will remain. If the phase calibration is accurate, this peak final imbalance will be at a level 302, which equals half of the first imbalance (the imbalance that distinguishes the balancing masses from each other), e.g. 0.08 gm-mm in the example embodiment of TABLE 1. The population of disk drives corresponding to neither of the two aforementioned situations makes up the rest of the sawtooth distribution.

Figure 4:
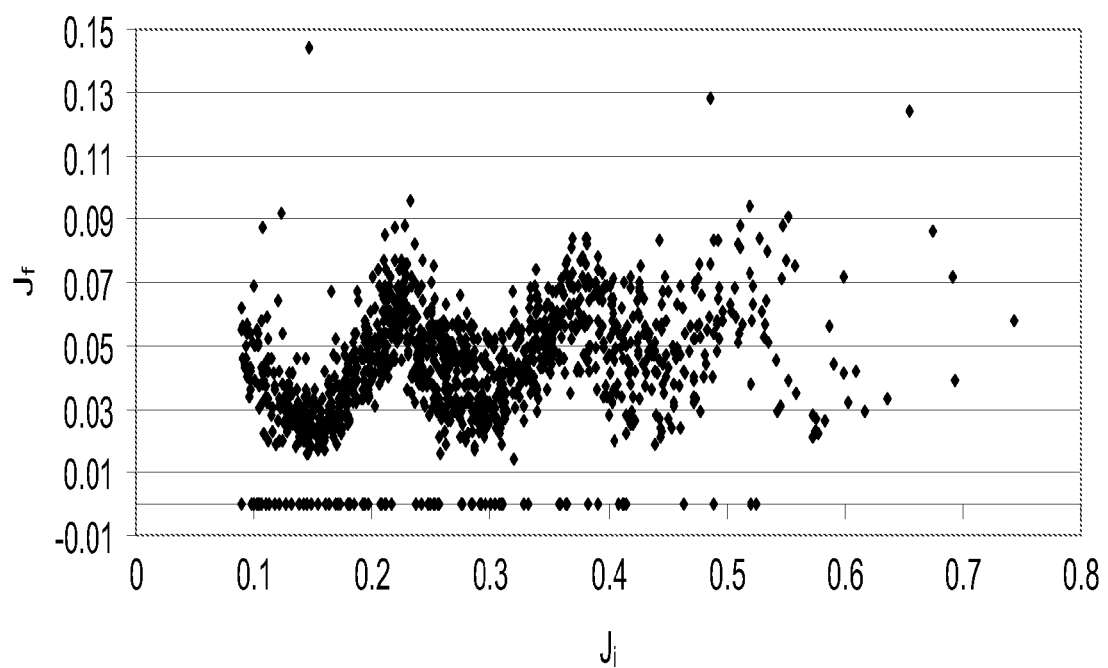
FIG. 4 depicts a measured distribution of final imbalance versus initial imbalance for a population of disk drives, according to an embodiment of the present invention with accurate amplitude calibration.

FIG. 4 depicts a measured distribution of final imbalance $J_f$ versus initial imbalance J, for a population of disk drives, according to an example embodiment of the present invention. The measured distribution of FIG. 4 roughly corresponds to the theoretical distribution of FIG. 3, indicating that the amplitude calibration is acceptably accurate.

The electrical signal that corresponds to the initial imbalance referred to in step 204 of FIG. 2, and the electrical signal that corresponds to the final imbalance referred to in step 212 of FIG. 2, may be measured using a transducer coupled to the disk drive. For example, a motion sensing transducer such as an accelerometer, or a force measuring transducer such as a strain gauge, may be utilized to provide an electrical signal that corresponds to the imbalance of the spindle. Alternatively, a non-contact motion measurement method, such as a laser Doppler vibrometer or anemometer might be used to provide an electrical signal that corresponds to the imbalance of the spindle.

The measured distribution of the final imbalance $J_f$ versus the initial imbalance $J_i$ for the plurality of disk drives may be determined in the memory of a computer by a computer processor with a resulting plot being displayed on a display device. Alternatively, the measured distribution of the final imbalance $J_f$ versus the initial imbalance $J_i$ for the plurality of disk drives may be determined in the memory of a computer by a computer processor without a resulting plot being displayed on any display device. Likewise, the theoretical distribution of the final imbalance $J_f$ versus the initial imbalance $J_i$ may be determined by a computer with or without a resulting plot being displayed on any display device.

Figure 5A:
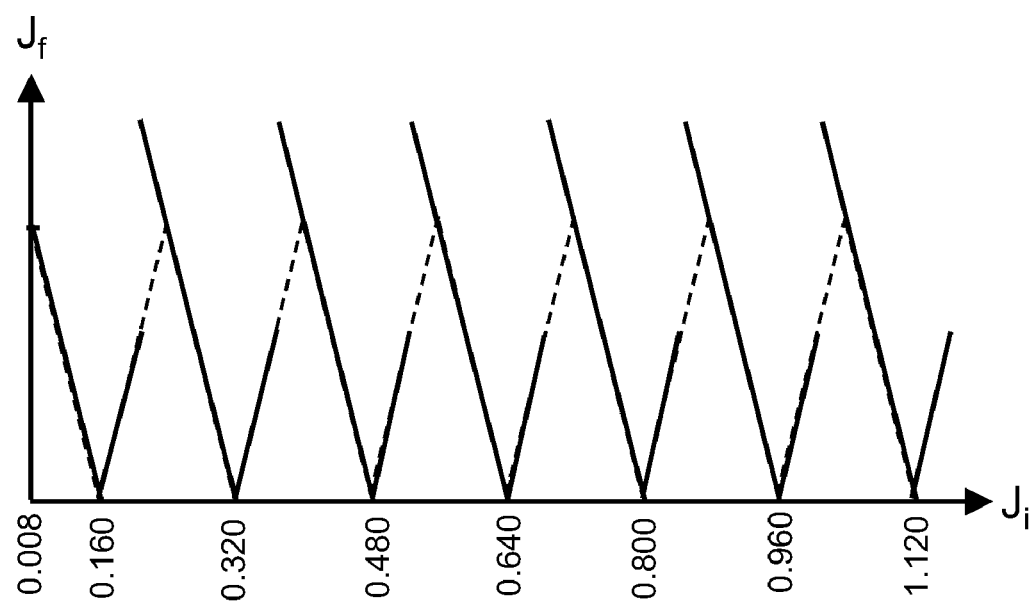
FIG. 5A depicts a theoretical distribution of final imbalance versus initial imbalance, according to an embodiment of the present invention with imperfect amplitude calibration (gain too high) but ideal phase calibration.

FIG. 5A depicts a theoretical distribution of final imbalance $J_f$ versus initial imbalance $J_i$, according to an embodiment of the present invention with imperfect amplitude calibration but ideal phase calibration. The dashed line indicates where the distribution would fall if the amplitude calibration were accurate. Amplitude calibration determines a "gain," which is the factor multiplied with the data from the imbalance transducer to yield the amount of imbalance. When the amplitude calibration is imperfect (i.e. gain is too high or too low), then the selection of the balancing mass in step 208 of FIG. 2 may not be correct.

FIG. 5A graphically depicts how the theoretical distribution of final imbalance $J_f$ versus initial imbalance $J_i$ may be affected when the gain is too high. For example, in the embodiment of TABLE 1, if the initial imbalance $J_i$=0.21 g-mm, then the balancing mass having a 0.16 g-mm imbalance should be chosen, leading to a final imbalance $J_f$=(0.21 g-mm–0.16 g-mm)=0.05 g-mm. However, if the amplitude calibration gain is 20% too high, then the initial imbalance J, will be incorrectly determined to be 1.2·(0.21 g-mm)=0.25 g-mm. Based on this incorrect initial determination, the balancing mass having a 0.32 g-mm imbalance will appear to be the best selection from TABLE 1 and so will be chosen. Consequently, the final imbalance will be $J_f$=(0.32 g-mm–0.21 g-mm)=0.11 g-mm. Note that the final imbalance in this situation (0.11 g-mm) not only significantly exceeds the final imbalance when the amplitude calibration is accurate (0.05 g-mm), it also exceeds the maximum final imbalance (0.08 g-mm) for any initial imbalance given the embodiment of TABLE 1 and accurate amplitude calibration.

Figure 5B:
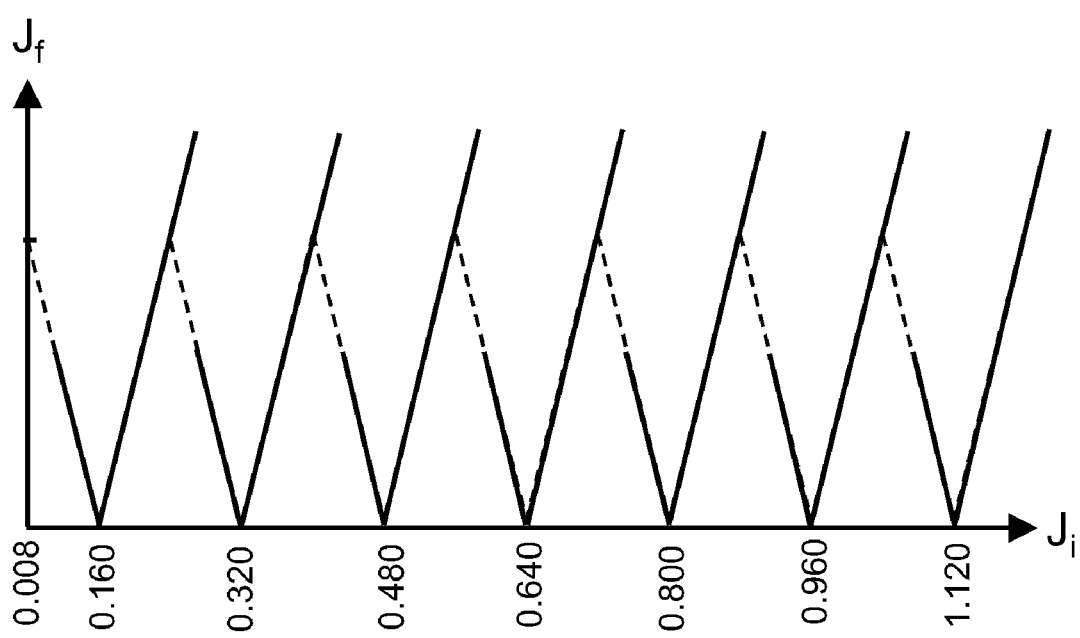
FIG. 5B depicts a theoretical distribution of final imbalance versus initial imbalance, according to an embodiment of the present invention with imperfect amplitude calibration (gain too low) but ideal phase calibration.

FIG. 5B also depicts a theoretical distribution of final imbalance $J_f$ versus initial imbalance $J_i$, according to an embodiment of the present invention with imperfect amplitude calibration but ideal phase calibration. In this figure too, the dashed line indicates where the distribution would fall if the amplitude calibration were accurate. Specifically, FIG. 5B graphically depicts how the theoretical distribution of final imbalance $J_f$ versus initial imbalance $J_i$ may be affected when the gain is too low. For example, in the embodiment of TABLE 1, if the initial imbalance $J_i$=0.28 g-mm, then the balancing mass having a 0.32 g-mm imbalance should be chosen, leading to a final imbalance $J_f$=(0.32 g-mm–0.28 g-mm)=0.04 g-mm. However, if the amplitude calibration gain is 20% too low, then the initial imbalance J, will be incorrectly determined to be (1.0/1.2)·(0.28 g-mm)=0.23 g-mm. Based on this incorrect initial determination, the balancing mass having a 0.16 g-mm imbalance will appear to be the best selection from TABLE 1 and so will be chosen. Consequently, the final imbalance will be $J_f$=(0.28 g-mm–0.16 g-mm)=0.12 g-mm. Note that the final imbalance in this situation (0.12 g-mm) not only significantly exceeds the final imbalance when the amplitude calibration is accurate (0.04 g-mm), it also exceeds the maximum final imbalance (0.08 g-mm) for any initial imbalance given the embodiment of TABLE 1 and an accurate amplitude calibration.

Figure 6:
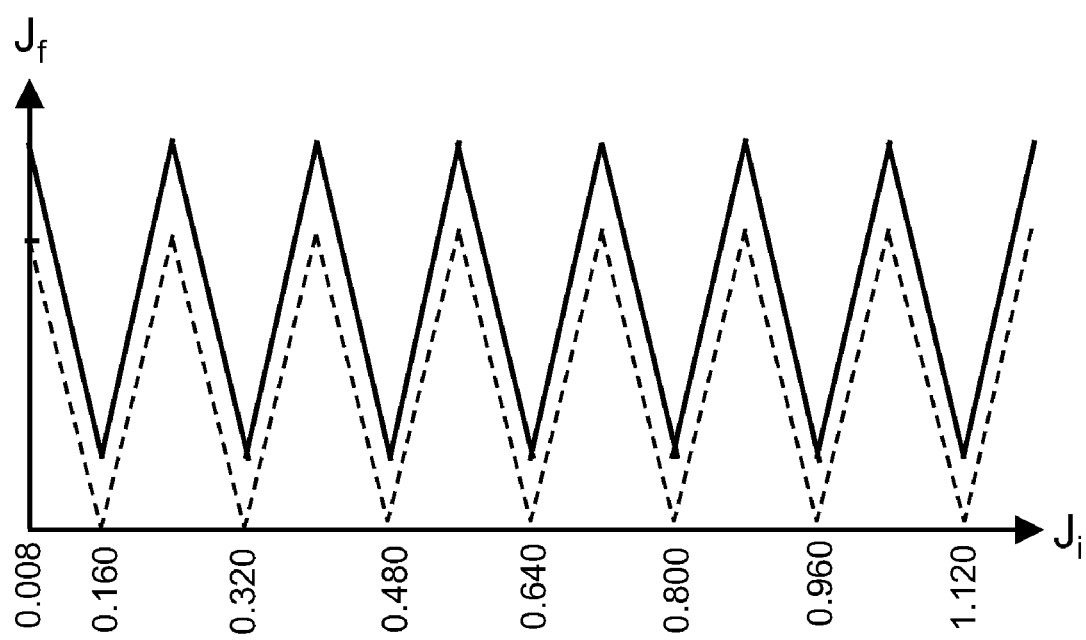
FIG. 6 depicts a theoretical distribution of final imbalance versus initial imbalance, according to an embodiment of the present invention with imperfect phase calibration but ideal amplitude calibration.

FIG. 6 depicts a theoretical distribution of final imbalance versus initial imbalance, according to an embodiment of the present invention with imperfect phase calibration (but ideal amplitude calibration). The dashed line indicates where the distribution would fall if the phase calibration were accurate. It can be seen from FIG. 6 that imperfect phase calibration causes the final imbalance to be higher than otherwise theoretically expected. The reason why this is true is that if phase calibration is imperfect, the balancing mass attachment in step 210 of FIG. 2 will be at an incorrect angular position so that complete cancellation of the initial imbalance $J_i$ is not possible even when the correcting imbalance of the balancing weight equals the initial imbalance $J_i$. That is, if the angular position is incorrect, then the imbalance of the balancing mass will not directly oppose the initial imbalance $J_i$ in phase as they both rotate with the spindle. Note that the final imbalance $J_f$ plotted in FIG. 6 everywhere exceeds the initial imbalance $J_i$ and does not reach zero even at local minimums.

The phase calibration may be adjusted based on a comparison of the measured distribution and the theoretical distribution, for example, a comparison of a peak-to-peak amplitude of the measured distribution and a theoretical amplitude of the theoretical distribution. Preferably for enhanced accuracy of the method, but not necessarily, the plurality of disk drives upon which the measured distribution is based includes a number of disk drives that is large enough such that at least five measured values of $J_f$ fall before at least one of the peaks in the measured distribution, and at least five measured values also fall after that same peak. Alternatively, the phase calibration may be adjusted based on a comparison of the initial phase and the final phase for any one of the plurality of disk drives.

Figure 7:
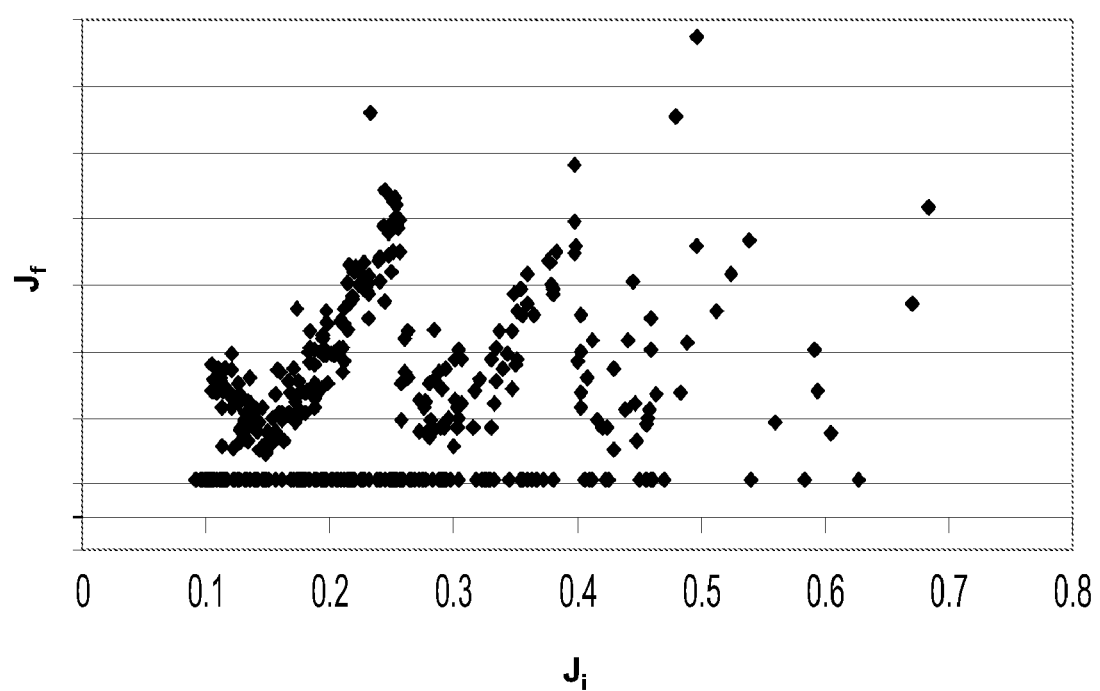
FIG. 7 depicts a measured distribution of final imbalance versus initial imbalance, according to an embodiment of the present invention with imperfect amplitude calibration.

FIG. 7 depicts a measured distribution of final imbalance $J_f$ versus initial imbalance $J_i$, according to an embodiment of the present invention with imperfect amplitude calibration. The measured distribution of FIG. 7 roughly corresponds to the theoretical distribution of FIG. 5B, indicating that the accuracy of the amplitude calibration may be improved by increasing the gain, for example in step 220 of FIG. 2. That is, the amplitude calibration may be adjusted based on the asymmetry of peaks in the measured distribution where peaks in the theoretical distribution are expected to be symmetric. The method 200 is preferably automated so that steps 204 through 214 are performed by the same automated balancing apparatus. However, it is contemplated that one or more of the steps may be done manually and/or be performed by a second apparatus. Preferably but not necessarily, step 220 may also be so automated. For example, in step 220 of FIG. 2, the measured distribution and the theoretical distribution may be compared by the processor of a computer, with or without the comparison being displayed.

For example, the amplitude calibration may be automatically adjusted in an iterative process where the theoretically expected distribution of $J_f$ versus $J_i$ is compared with the measured distribution of $J_f$ versus $J_i$ by the processor of a computer. Preferably for enhanced accuracy of the method, but not necessarily, the plurality of disk drives upon which the measured distribution is based includes a number of disk drives that is large enough such that at least five measured values of $J_f$ fall before at least one of the peaks in the measured distribution, and at least five measured values also fall after that same peak. The computer then adjusts the gain of the amplitude calibration and continues to record initial and final imbalance data during the manufacturing process. The theoretically expected distribution of $J_f$ versus $J_i$ is then again compared with the measured distribution of $J_f$ versus $J_i$ by the processor of the computer and the gain of the amplitude calibration is re-adjusted, for example using a conventional numerical recipe to extrapolate, interpolate, and converge, such as linear interpolation or linear extrapolation, so as to reduce or minimize the amplitude of the highest points (i.e. maxima) in the distribution of final imbalance $J_f$ versus initial imbalance $J_i$.

The same automatic process may be followed to automatically adjust the phase calibration, for example by interactively adjusting the angular calibration while seeking to reduce or minimize the amplitude of the lowest points (i.e. minima) in the distribution of final imbalance $J_f$ versus initial imbalance $J_i$.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

We claim:

1. A method to balance spindles in a plurality of disk drives, the method comprising:
    a) rotating the spindle of one of the plurality of disk drives;
    b) while the spindle of that one of the plurality of disk drives is rotating, measuring an initial amplitude and an initial phase of an electrical signal that corresponds to an initial imbalance for that one of the plurality of disk drives;
    c) determining the initial imbalance based on the initial amplitude and an amplitude calibration;
    d) selecting one of a plurality of balancing masses, the selection being based on the initial imbalance;
    e) attaching the selected balancing mass to the spindle of that one of the plurality of disk drives, with the selected balancing mass at an angular position selected based upon the initial phase and a phase calibration;
    f) again rotating the spindle of that one of the plurality of disk drives;
    g) while the spindle of that one of the plurality of disk drives is again rotating, measuring a final amplitude and a final phase of an electrical signal that corresponds to a final imbalance for that one of the plurality of disk drives;
    h) determining the final imbalance based on the final amplitude and an amplitude calibration;
    i) repeating steps a through h for each of the plurality of disk drives, recording the final imbalance and the initial imbalance for each of the plurality of disk drives;
    j) adjusting the amplitude calibration based on a comparison of a measured distribution and a theoretical distribution of the final imbalance versus the initial imbalance.

2. The method of claim 1 wherein the theoretical distribution of the final imbalance versus the initial imbalance is a distribution expected for a fictitious population of disk drives having randomly distributed imbalances.

3. The method of claim 1 wherein each of the plurality of balancing masses comprises a C-shaped wire ring having a ring center and a circumferential gap that defines a circumferential gap length.

4. The method of claim 3 wherein a wire cross-sectional diameter of each of the plurality of balancing masses is the same.

5. The method of claim 1 wherein each of the plurality of balancing masses has a known imbalance that differs from another of the balancing masses by a first imbalance difference.

6. The method of claim 5 wherein each of the plurality of balancing masses comprises a C-shaped ring having a ring center and a circumferential gap that defines a circumferential gap length, the circumferential gap length determining the known imbalance.

7. The method of claim 6 wherein each of the plurality of balancing masses defines a ring radius measured between the ring center and the circumferential gap, and wherein the ring radius for each of the plurality of balancing masses is the same.

8. The method of claim 5 wherein theoretical distribution of the final imbalance versus the initial imbalance is a periodic sawtooth distribution having a theoretical period that is equal to the first imbalance difference, and having a theoretical amplitude that is equal to half of the first imbalance difference.

9. The method of claim 1 further comprising adjusting the phase calibration based on a comparison of the measured distribution and the theoretical distribution.

10. The method of claim 9 wherein the phase calibration is adjusted to reduce the amplitude of minima in the measured distribution of final imbalance versus initial imbalance.

11. The method of claim 1 wherein the amplitude calibration is adjusted based on an asymmetry of peaks in the measured distribution where peaks in the theoretical distribution are expected to be symmetric.

12. The method of claim 1 wherein the amplitude calibration is adjusted to reduce the amplitude of maxima in the measured distribution of final imbalance versus initial imbalance.

13. The method of claim 1 wherein the electrical signal that corresponds to the initial imbalance, and the electrical signal that corresponds to the final imbalance, originate from a transducer coupled to said one of the plurality of disk drives.

14. The method of claim 1 further comprising adjusting the phase calibration based on a comparison of the initial phase and the final phase for any one of the plurality of disk drives.

15. The method of claim 1 wherein the measured distribution of the final imbalance versus the initial imbalance for the plurality of disk drives is determined in the memory of a computer by a computer processor without a resulting plot being displayed on any display device.

16. The method of claim 1 wherein the theoretical distribution of the final imbalance versus the initial imbalance is determined by a computer without a resulting plot being displayed on any display device.

17. The method of claim 1 wherein the measured distribution of the final imbalance versus the initial imbalance for the plurality of disk drives is determined in the memory of a computer by a computer processor with a resulting plot being displayed on a display device.

18. The method of claim 1 wherein comparison of the measured distribution and the theoretical distribution is accomplished by the processor of a computer without the comparison being displayed.

19. The method of claim 1 wherein at least steps b through e, g, and h are performed by a first automated balancing apparatus.

20. The method of claim 1 further comprising temporarily stopping the spindle rotation after step c.

\* \* \* \* \*